United States Patent
Gui et al.

(10) Patent No.: US 8,434,299 B2
(45) Date of Patent: May 7, 2013

(54) STRATEGY EMPLOYING EXHAUST BACK-PRESSURE FOR BURNING SOOT TRAPPED BY A DIESEL PARTICULATE FILTER

(75) Inventors: Xinqun Gui, Naperville, IL (US); Guoqing Zhang, Lisle, IL (US); Xinlei Wang, Naperville, IL (US)

(73) Assignee: International Engine Intellectual Property Company, LLC., Lisle, IL (US)

( * ) Notice: Subject to any disclaimer, the term of this patent is extended or adjusted under 35 U.S.C. 154(b) by 2034 days.

(21) Appl. No.: 10/369,016

(22) Filed: Feb. 19, 2003

(65) Prior Publication Data

US 2004/0159098 A1    Aug. 19, 2004

(51) Int. Cl.
*F01N 3/00* (2006.01)
*F01N 5/04* (2006.01)
*F01N 3/02* (2006.01)

(52) U.S. Cl.
USPC .............. 60/295; 60/280; 60/287; 60/291; 60/311

(58) Field of Classification Search .............. 60/274, 60/280, 295, 297, 300, 311, 602, 292; 55/283, 55/312, DIG. 30
See application file for complete search history.

(56) References Cited

U.S. PATENT DOCUMENTS

| | | | | |
|---|---|---|---|---|
| 4,492,079 A * | 1/1985 | Takagi et al. | | 60/311 |
| 4,835,963 A * | 6/1989 | Hardy | | 60/274 |
| 4,986,069 A * | 1/1991 | Barris et al. | | 60/274 |
| 5,050,376 A * | 9/1991 | Stiglic et al. | | 60/280 |
| 5,067,háto6 7 A * | 11/1991 | Pattas | | 55/283 |
| 6,090,187 A * | 7/2000 | Kumagai | | 95/278 |
| 6,237,326 B1 * | 5/2001 | Russell | | 60/274 |
| 6,314,735 B1 * | 11/2001 | Kolmanovsky et al. | | 60/602 |
| 6,568,173 B1 * | 5/2003 | Kolmanovsky et al. | | 60/280 |
| 6,594,990 B2 * | 7/2003 | Kuenstler et al. | | 60/311 |
| 2003/0230078 A1 * | 12/2003 | Yahata et al. | | 60/295 |

* cited by examiner

*Primary Examiner* — Kenneth Bomberg
*Assistant Examiner* — Audrey K Bradley
(74) *Attorney, Agent, or Firm* — Mark C. Bach; Jeffrey P Calfa

(57) ABSTRACT

An exhaust system (16) of a diesel engine (10) has a diesel particulate filter (18) for treating exhaust gas. When trapped soot has accumulated to an extent that may affect performance of the filter, an engine control system (12) forces combustion of trapped soot by increasing exhaust back-pressure using a control device (20) such as a back-pressure control valve or vanes of a variable geometry turbocharger.

2 Claims, 2 Drawing Sheets

STRATEGY EMPLOYING EXHAUST BACK-PRESSURE FOR BURNING SOOT TRAPPED BY A DIESEL PARTICULATE FILTER

FIELD OF THE INVENTION

This invention relates generally to diesel engines that have diesel particulate filters for treating exhaust gases passing through their exhaust systems. More particularly, the invention relates to engine systems and methods employing exhaust back-pressure for burning soot trapped by such a filter.

BACKGROUND OF THE INVENTION

An exhaust system of a diesel engine that comprises a diesel particulate filter (DPF) is capable of physically trapping diesel particulate matter (DPM) in exhaust gas passing through the exhaust system from the engine. This prevents significant amounts of DPM from entering the atmosphere. Soot is one constituent of DPM. Other constituents include the soluble organic fraction (SOF) and ash (i.e. lube oil additives etc.). The trapping of soot by a DPF prevents what is sometimes seen as black smoke billowing from a vehicle's exhaust pipe.

One type of known DPF is marketed by Johnson Matthey Company under the trade name "Continuously Regenerating Trap" or (CRT™). Another type of known DPF is marketed by Englehard Corporation under the trade name DPX™.

DPF's have previously been used in warm climates without forced regeneration. One possible strategy for forced regeneration of a DPF involves using the engine control system to adjust engine fueling in a way that elevates the exhaust gas temperature to a sufficiently high temperature to combust material trapped by the DPF. If such a strategy is to be as transparent as possible to a driver of the vehicle, it generally requires that the vehicle is being operated in a manner that is both compatible with and substantially unaffected by the extra fueling needed to elevate exhaust gas temperature. It is believed fair to say that a successful strategy will introduce a certain amount of complexity into an engine control system.

SUMMARY OF THE INVENTION

Accordingly, a strategy that does not introduce as much complexity into an engine control system may be advantageous for certain engines in certain motor vehicles.

The present invention relates to engines and methods that employ exhaust back-pressure (EBP) to create suitable exhaust gas temperatures for accomplishing forced combustion of soot trapped by a DPF. The forced combustion process is itself conducted according to an algorithm that processes certain data to control exhaust back-pressure.

Accordingly, one generic aspect of the present invention relates to a method for selectively forcing combustion of soot that has been trapped in a diesel particulate filter that treats exhaust gas passing through an exhaust system of a diesel engine.

The method comprises, with the engine running, repeatedly processing data indicative of exhaust gas temperature, data indicative of pressure drop across the diesel particulate filter, data indicative of mass flow through the engine, and data correlating various combinations of pressure drop and mass flow with conditions distinguishing between mandating forced combustion of trapped soot, permitting forced combustion of trapped soot, and not forcing combustion of trapped soot.

When a result of the processing step discloses a condition mandating forced combustion of trapped soot, operating a device, regardless of exhaust gas temperature, that increases exhaust back-pressure on the engine sufficiently to cause elevation of the temperature of exhaust gas entering and passing through the diesel particulate filter to a temperature sufficient to initiate combustion of trapped soot.

When the result of the processing step discloses a condition permitting forced combustion of trapped soot, operating the device, provided that exhaust gas temperature exceeds a defined temperature threshold, to increase exhaust back-pressure on the engine sufficiently to cause elevation of the temperature of exhaust gas entering and passing through the diesel particulate filter to a temperature sufficient to initiate combustion of trapped soot.

Another generic aspect of the present invention relates to a diesel engine comprising an exhaust system comprising a diesel particulate filter that treats exhaust gas from the engine, an exhaust back-pressure control device for increasing exhaust back-pressure on the engine sufficiently to cause elevation of the temperature of exhaust gas entering and passing through the diesel particulate filter to a temperature sufficient to initiate combustion of soot trapped by the diesel particulate filter, and a control system for selectively forcing combustion of soot trapped in the diesel particulate filter.

The control system comprises a processor that with the engine running repeatedly processes data indicative of exhaust gas temperature, data indicative of pressure drop across the diesel particulate filter, data indicative of mass flow through the engine, and data correlating various combinations of pressure drop and mass flow with conditions distinguishing between mandating forced combustion of trapped soot, permitting forced combustion of trapped soot, and not forcing combustion of trapped soot.

When a result of the processing discloses a condition mandating forced combustion of trapped soot, the control system operates the exhaust back-pressure control device, regardless of exhaust gas temperature, to increase exhaust back-pressure on the engine sufficiently to cause elevation of the temperature of exhaust gas entering and passing through the diesel particulate filter to a temperature sufficient to initiate combustion of trapped soot.

When a result of the processing discloses a condition permitting forced combustion of trapped soot, the control system operates the exhaust back-pressure control device, provided that exhaust gas temperature exceeds a defined temperature threshold, to increase exhaust back-pressure on the engine sufficiently to cause elevation of the temperature of exhaust gas entering and passing through the diesel particulate filter to a temperature sufficient to initiate combustion of trapped soot.

The foregoing, along with further features and advantages of the invention, will be seen in the following disclosure of a presently preferred embodiment of the invention depicting the best mode contemplated at this time for carrying out the invention. This specification includes drawings, now briefly described as follows.

DESCRIPTION OF THE PREFERRED EMBODIMENT

Figure 1:
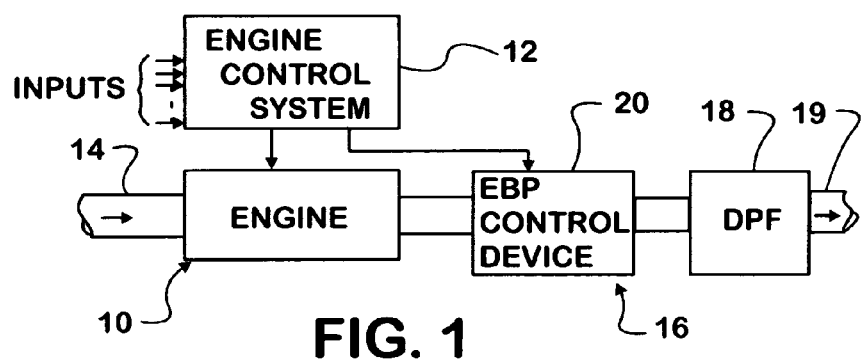
FIG. 1 is a general schematic diagram of an exemplary diesel engine having a control system for forcing combustion of soot trapped by a DPF in the exhaust system in accordance with principles of the present invention.

FIG. 1 shows a schematic diagram of an exemplary diesel engine 10 for powering a motor vehicle. Engine 10 has a processor-based engine control system 12 that processes data from various sources to develop various control data for controlling various aspects of engine operation. The data processed by control system 12 may originate at external sources, such as sensors, and/or be generated internally.

Engine 10 comprises an intake system 14 through which charge air enters the engine. Fuel is injected into cylinders of engine 10 under the control of control system 12 to form a mixture that is combusted to power the engine. Exhaust gases resulting from combustion within the engine cylinders exit through an exhaust system 16 that includes a DPF 18 for treating the exhaust gases before they pass through an exhaust pipe 19 into the atmosphere. Before reaching DPF 18, the exhaust gases must pass through an EPB control device 20, an example of which is an electric-controlled butterfly valve, that is under the control of control system 12. Another example of EPB control device is the vanes of a variable geometry, or variable nozzle, turbocharger.

When EBP control device 20 is maximally open, it imposes minimal restriction to exhaust gas flow. When EBP control device 20 is maximally closed, it imposes maximal restriction to exhaust gas flow. Within a range between maximally open and maximally closed, device 20 imposes restriction that corresponds to the extent to which it is closed in accordance with a control signal applied to it as a result of certain processing performed by control system 12.

Figure 2:
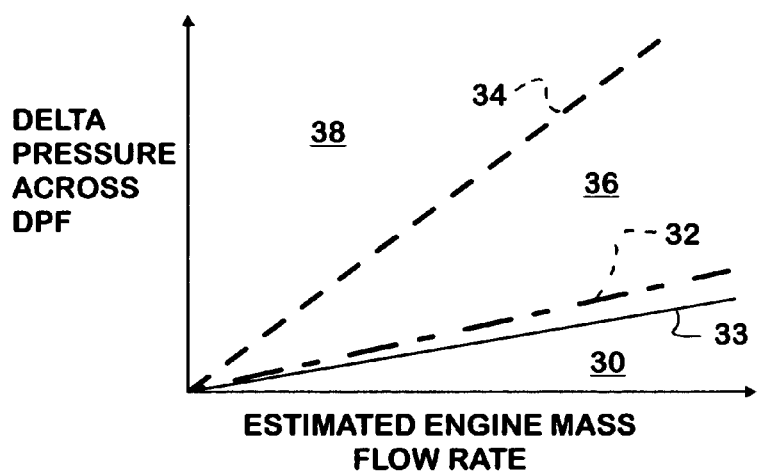
FIG. 2 is a graph plot useful in explaining certain principles of the invention.

FIG. 2 shows several plots correlating pressure drop across DPF 18 ($\Delta P$) with mass flow rate through engine 10. Mass airflow rate through the engine, either measured or calculated, is a suitable approximation for mass flow rate. When EBP control device 20 is maximally open and DPF 18 is relatively free of trapped soot, large mass flow rates create relatively small $\Delta P$ across DPF 18. This is exemplified by a zone of operation 30 that lies below a plot 32 representing values for a Lower Limit of $\Delta P$ versus mass flow rate. An example of a "clean" DPF is shown by a plot 33.

A further plot 34 representing values for an Upper Limit of $\Delta P$ versus mass flow rate forms an upper boundary for a further zone of operation 36 whose lower boundary is plot 32. Values of mass flow rate that result in values for $\Delta P$ lying within zone 36 are indicative of more substantial accumulations of trapped soot in DPF 18. Values of mass flow rate that result in values for $\Delta P$ lying within a zone 38 above plot 34 are indicative of even more substantial accumulations of trapped soot in DPF 18.

Briefly, the zone in which DPF 18 is operating determines whether forced burning of trapped soot is called for. In particular: 1) when data, either measured or estimated, indicates that DPF 18 is operating within zone 30, control system 12 recognizes that the amount of soot accumulation in DPF 18 is below an amount that calls for forced burning; 2) when data, either measured or estimated, indicates that DPF 18 is operating within zone 36, control system 12 recognizes that the amount of soot accumulation in DPF 18 is appropriate for forced burning, provided that exhaust gas temperature also exceeds some threshold; and 3) when data, either measured or estimated, indicates that DPF 18 is operating within zone 38, control system 12 recognizes that the amount of soot accumulation in DPF 18 is appropriate for forced burning, regardless of exhaust gas temperature. When burning is not being forced, EBP control device 20 will typically be maximally open, unless being closed to some extent by a strategy that is unrelated to that of the present invention.

Figure 3:
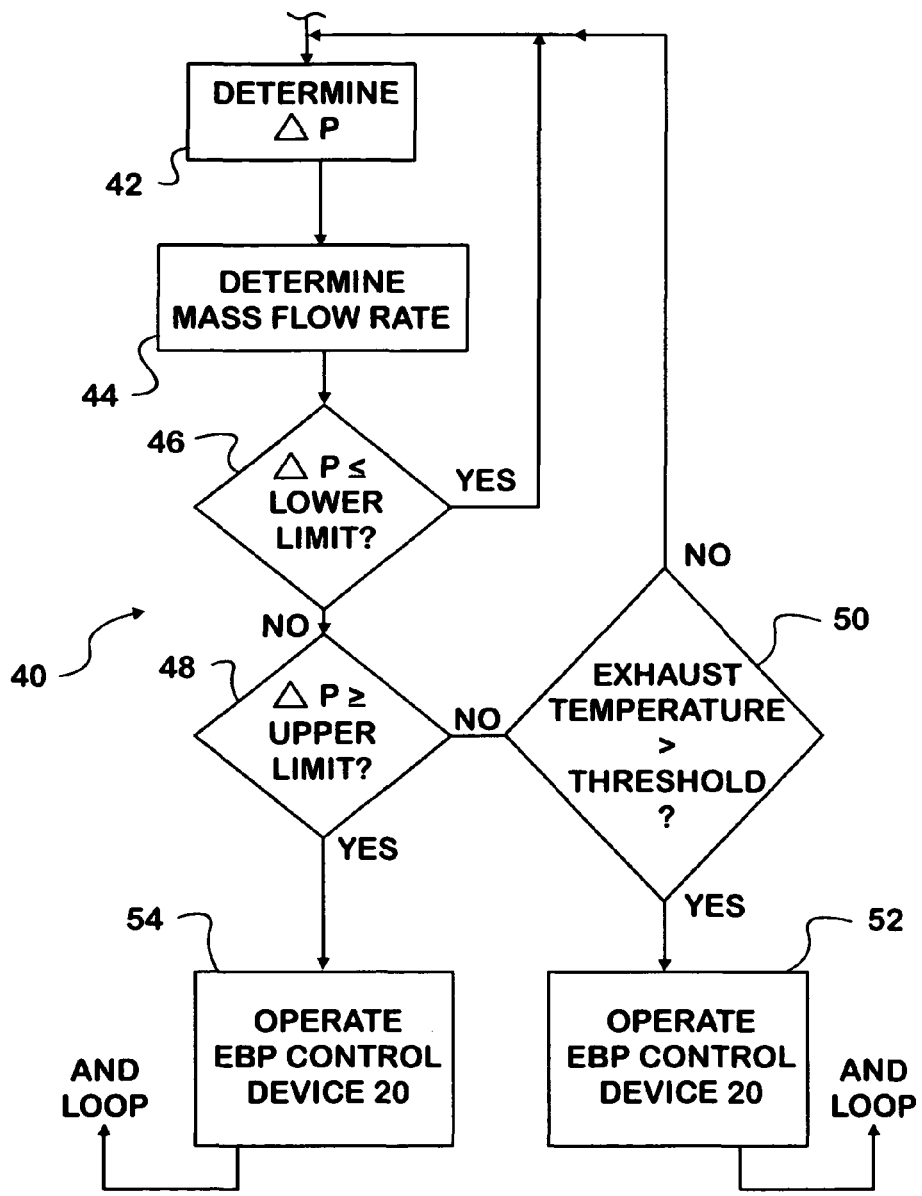
FIG. 3 is a flow diagram of an algorithm performed by the control system of FIG. 1.

The inventive strategy is implemented in control system 12 as an algorithm that is repeatedly executed as the engine operates. FIG. 3 presents an example of such an algorithm 40. One of the initial steps 42 comprises determining a data value for $\Delta P$ in any suitably appropriate way, such as by actual pressure sensing. Another of the initial steps 44 comprises determining, in any suitably appropriate way, a data value for mass flow rate through the engine.

Once those two data values have been obtained, a step 46 determines if the data value for $\Delta P$ exceeds the Lower Limit value corresponding to the mass flow rate data value. A data value for $\Delta P$ that does not exceed the Lower Limit value corresponding to the mass flow rate data value indicates operation in zone 30, and hence no need for forced burning, in which event the algorithm loops back to the beginning to await its next execution. A data value for $\Delta P$ that does exceed the Lower Limit value corresponding to the mass flow rate data value indicates operation in zone 36 or zone 38, and hence the possibility for initiating forced burning, in which event the algorithm continues to execute.

A step 48 next determines if the data value for $\Delta P$ is less than the Upper Limit value corresponding to the mass flow rate data value. A data value for $\Delta P$ that is less than the Upper Limit value corresponding to the mass flow rate data value indicates operation in zone 36, and the possibility for initiating forced burning if exhaust gas temperature is greater than the aforementioned threshold. A data value for $\Delta P$ that does equal or exceed the Upper Limit value corresponding to the mass flow rate data value indicates operation in zone 38, and this will result in initiating forced burning regardless of the exhaust gas temperature.

Hence, if the data value for $\Delta P$ is less than the Upper Limit value corresponding to the mass flow rate data value, a step 56 is performed to determine exhaust gas temperature. Data representing exhaust gas temperature may be obtained in any suitably appropriate way. If step 50 determines that exhaust gas temperature is not greater than the threshold, 200° C. for example, EBP control device 20 is left maximally open, and the algorithm loops back to the beginning to await its next execution. If step 50 determines that exhaust gas temperature is greater than the threshold, control system 12 operates EBP control device 20 to some degree of closure, as indicated by a step 52. The degree of closure is determined via use of a look-up table that correlates various degrees; of closure with various combinations of values of engine speed and engine load. Data values for engine speed and engine load may be obtained in any suitably appropriate way. For example, engine speed data is typically published on a data bus while engine fueling data that is calculated by on-going processing in control system 12 is indicative of engine load.

The increased restriction created by increased closing of device 20 serves to elevate the temperature of the exhaust gases entering and passing through DPF 18 to temperatures sufficient to initiate combustion of soot trapped by the DPF. Repeated execution of the algorithm will continue to keep device 20 closed to some degree so that the combustion of trapped soot continues to be forced. The burned soot passes through exhaust pipe 19 to atmosphere as essentially carbon dioxide.

As the soot is burned off, the restriction that DPF 18 imposes on exhaust gas flow diminishes, and eventually DPF operation will return to zone 30, at which time the forced burning of soot will cease and device 18 will be returned to maximally open condition because the conditions that initiated forced burning will no longer prevail.

Should the execution of step 48 have determined that the data value for ΔP equals or exceeds the Upper Limit value corresponding to the mass flow rate data value, control system 12 would have initiated forced burning regardless of the exhaust gas temperature by operating EBP control device 20 to some degree of closure, as indicated by a step 54. The degree of closure is determined via use of the look-up table that contains correlations of degree of closure with various combinations of values of engine speed and engine load.

The increased restriction created by increased closing of device 20 serves to elevate the temperature of the exhaust gases passing through DPF 18 to temperatures sufficient to initiate combustion of trapped soot. Repeated execution of the algorithm will continue to keep device 20 closed to some degree so that the combustion of trapped soot continues to be forced. As the soot is burned off, the restriction that the DPF imposes on exhaust gas flow diminishes, and eventually DPF operation will return to zone 30, at which time the forced burning of soot will cease and device 18 will be returned to maximally open condition because the conditions that initiated forced burning will no longer prevail. Although operation toward zone 30 from zone 38 will inherently pass through zone 36, it is most likely that exhaust gas temperature will not diminish below the threshold level that would result in continued operation in zone 36 without reaching zone 30.

It is believed that the inventive strategy avoids any significant interaction with existing engine control strategies so that the inventive strategy can be implemented in existing control systems without complicating such existing strategies. A benefit of this is the opportunity for retrofitting existing motor vehicles whose engines are already equipped with so-called "passive DPF's". To the extent that an existing vehicle also has an EBP control device, such a device need not be added to the vehicle, a further advantage of the inventive strategy.

While a presently preferred embodiment of the invention has been illustrated and described, it should be appreciated that principles of the invention apply to all embodiments falling within the scope of the following claims.

What is claimed is:

1. A diesel engine comprising:
   an exhaust system comprising a diesel particulate filter that treats exhaust gas from the engine;
   an exhaust back-pressure control device for increasing exhaust back-pressure on the engine sufficiently to cause elevation of the temperature of exhaust gas entering and passing through the diesel particulate filter to a temperature sufficient to initiate combustion of soot trapped by the diesel particulate filter; and
   a control system for selectively forcing combustion of soot trapped in the diesel particulate filter, wherein the control system comprises a processor that with the engine running
   a) repeatedly processes data indicative of exhaust gas temperature, data indicative of pressure drop across the diesel particulate filter, data indicative of mass flow through the engine, and data correlating various combinations of pressure drop and mass flow with conditions distinguishing between mandating forced combustion of trapped soot, permitting forced combustion of trapped soot, and not forcing combustion of trapped soot, and
   b) when a result of the processing discloses a condition mandating forced combustion of trapped soot, the control system operates the exhaust back-pressure control device, regardless of exhaust gas temperature, to increase exhaust back-pressure on the engine sufficiently to cause elevation of the temperature of exhaust gas entering and passing through the diesel particulate filter to a temperature sufficient to initiate combustion of trapped soot, and
   c) when a result of the processing discloses a condition permitting forced combustion of trapped soot, the control system operates the exhaust back-pressure control device, provided that exhaust gas temperature exceeds a defined temperature threshold, to increase exhaust back-pressure on the engine sufficiently to cause elevation of the temperature of exhaust gas entering and passing through the diesel particulate filter to a temperature sufficient to initiate combustion of trapped soot, in which after the processing has disclosed a condition permitting forced combustion of trapped soot and that exhaust gas temperature exceeds the threshold, the processor processes data that correlates various combinations of engine speed data and engine load data with various degrees of operation of the exhaust back-pressure control device to yield data defining a certain degree to which the device should be operated, and then the control system operates the device to that certain degree.

2. A method for selectively forcing combustion of soot that has been trapped in a diesel particulate filter that treats exhaust gas passing through an exhaust system of a diesel engine, the method comprising:
   with the engine running, repeatedly processing data indicative of exhaust gas temperature, data indicative of pressure drop across the diesel particulate filter, data indicative of mass flow through the engine, and data correlating various combinations of pressure drop and mass flow with conditions distinguishing between mandating forced combustion of trapped soot, permitting forced combustion of trapped soot, and not forcing combustion of trapped soot,
   when a result of the processing step discloses a condition mandating forced combustion of trapped soot, operating a device, regardless of exhaust gas temperature, that increases exhaust back-pressure on the engine sufficiently to cause elevation of the temperature of exhaust gas entering and passing through the diesel particulate filter to a temperature sufficient to initiate combustion of trapped soot, and
   when the result of the processing step discloses a condition permitting forced combustion of trapped soot, operating the device, provided that exhaust gas temperature exceeds a defined temperature threshold, to increase exhaust back-pressure on the engine sufficiently to cause elevation of the temperature of exhaust gas entering and passing through the diesel particulate filter to a temperature sufficient to initiate combustion of trapped soot, and after a result of the processing step has disclosed a condition permitting forced combustion of trapped soot and that exhaust gas temperature exceeds the threshold, processing data that correlates various combinations of engine speed data and engine load data with various degrees of operation of the device to yield data defining a certain degree to which the device should be operated, and then operating the device to that certain degree.

* * * * *